No. 778,875. PATENTED JAN. 3, 1905.
G. R. MATHEWS.
FISH HOOK.
APPLICATION FILED APR. 13, 1904.

Witnesses:
Ethel A. Feller
Otis A. Earl

Inventor,
George R. Mathews
By Fred L. Chappell
Att'y.

No. 778,875. Patented January 3, 1905

UNITED STATES PATENT OFFICE.

GEORGE R. MATHEWS, OF KALAMAZOO, MICHIGAN.

FISH-HOOK.

SPECIFICATION forming part of Letters Patent No. 778,875, dated January 3, 1905.

Application filed April 13, 1904. Serial No. 202,962.

*To all whom it may concern:*

Be it known that I, GEORGE R. MATHEWS, a citizen of the United States, residing at the city of Kalamazoo, in the county of Kalamazoo and State of Michigan, have invented certain new and useful Improvements in Fish-Hooks, of which the following is a specification.

This invention relates to improvements in fish-hooks.

The objects of this invention are, first, to provide an improved weedless fish-hook in which the hook is thoroughly protected to prevent its engagement with weeds or the like and at the same time one in which the hook-guard does not prevent the effective engagement of the hook when the same is struck by a fish; second, to provide an improved fish-hook in which the liability of the fish disengaging itself after being hooked is reduced to a minimum.

Further objects and objects relating to structural details will definitely appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1:
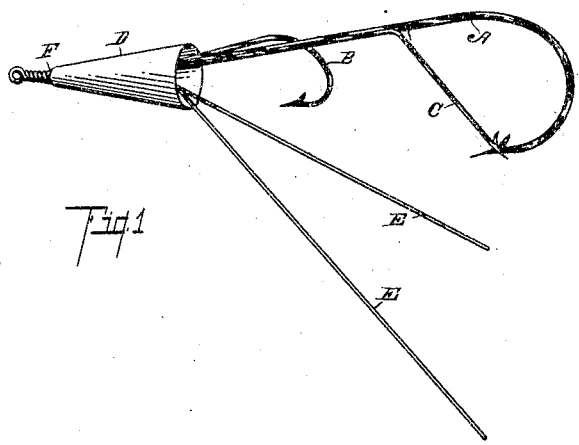
Figure 2:
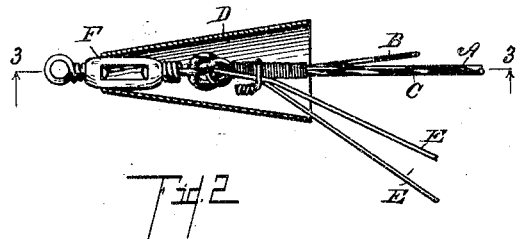
Figure 3:
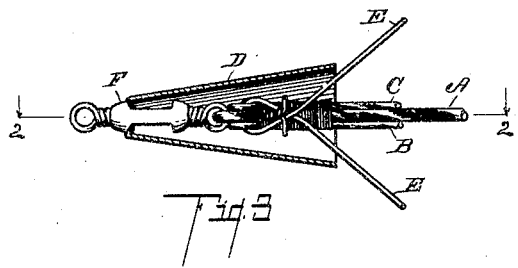

Figure 1 is a perspective view of my improved weedless fish-hook. Fig. 2 is a detail longitudinal sectional view taken on a line corresponding to line 2 2 of Fig. 3, portions being shown in full lines to show their structure and arrangement. Fig. 3 is a detail longitudinal sectional view taken on a line corresponding to line 3 3 of Fig. 2, portions being shown in full lines to show their structure and arrangement.

In the drawings the sectional views are taken looking in the direction of the little arrows at the ends of the section-lines, and similar letters of reference refer to similar parts throughout the several views.

Referring to the drawings, a main hook is provided. This main hook A is provided with a spring-guard C, the shank of which lies parallel with the shank of the hook A and is rigidly secured thereto at its forward end. The rearwardly and outwardly projecting point of the guard C lies close to the point of the hook A. This guard C is barbed, so that after the hook A is engaged it is practically impossible for a fish to release itself over the end of the hook, as in doing so it is engaged by the guard.

A bait-hook B is provided. The shank of this bait-hook B is placed alongside of the shank of the hook A and is rigidly secured thereto at their forward ends. The guard C and the bait-hook B are preferably bound to the shank of the main hook by wrapping with wire, as clearly appears in Figs. 2 and 3.

A pair of spring guard-arms E are rigidly secured to the forward end of the shank of the main hook A. This is preferably accomplished by passing a loop of spring-wire through the eye of the hook and wrapping with wire, as appears in the drawings. These arms diverge and project outwardly and rearwardly above the points of both the bait-hook and the main hook.

The main hook is secured to a suitable swivel F. Mounted on this swivel F is a cone-shaped guard D, which projects over the forward ends of the hook-shanks and guards and prevents the engagement of weeds or the like therewith. In use the spring-guards E prevent the accidental engagement of the hook, but do not prevent its proper engagement when a strike is received. As these spring-guards are rigidly secured to the hook-shank, they always maintain their proper relation thereto.

As before stated, the cone-shaped guard D protects the forward ends of the hook-shanks and guards and their attaching means from engagement and serves to part the weeds when the hook is drawn therethrough, and the weeds are further parted and the hook-points guarded by the spring-arms E.

I have illustrated and described my improved fish-hook in the form preferred by me on account of its structural simplicity and strength and effectiveness in use. I am, however, aware that it is capable of considerable structural variation without departing from my invention.

Having thus described my invention, what I claim as new, and desire to secure by Letters Patent, is—

1. The combination of a main hook; a spring-guard therefor, having an outwardly-projecting barbed portion, the point of which lies adjacent to the point of said main hook, and a shank portion arranged parallel with and rigidly secured to the shank of said main hook at its forward end; a bait-hook rigidly secured to the shank of said main hook at its forward end; outwardly and rearwardly diverging spring-guards adapted to guard the points of said hooks, rigidly secured to the shank of said main hook; a swivel to which the said main hook is secured; and a cone-shaped guard carried by said swivel, projecting rearwardly over the forward ends of said hook-shanks and guards, for the purpose specified.

2. The combination of a main hook; a bait-hook rigidly secured to the shank of said main hook at its forward end; outwardly and rearwardly diverging spring-guards adapted to guard the points of said hooks, rigidly secured to the shank of said main hook; a swivel to which said main hook is secured; and a cone-shaped guard carried by said swivel, projecting rearwardly over the front ends of said hook-shanks and guards, for the purpose specified.

3. The combination of a main hook; a spring-guard therefor, having an outwardly-projecting barbed portion, the point of which lies adjacent to the point of said main hook, and a shank portion arranged parallel with and rigidly secured to the shank of said main hook at its forward end; a bait-hook rigidly secured to the shank of said main hook, at its forward end; and outwardly and rearwardly diverging spring-guards adapted to guard the points of said hooks, rigidly secured to the shank of said main hook, for the purpose specified.

4. The combination of a main hook; a bait-hook rigidly secured to the shank of said main hook at its forward end; and outwardly and rearwardly diverging spring-guards adapted to guard the points of said hooks, rigidly secured to the shank of said main hook, for the purpose specified.

5. In a fish-hook, the combination of a hook; a spring-guard therefor having an outwardly-projecting barbed portion, the point of which lies adjacent to the point of said hook, and a shank portion arranged parallel with and rigidly secured to the shank of said hook at its forward end; outwardly and rearwardly diverging spring guard-arms adapted to guard the point of said hook, rigidly secured to the shank thereof; a swivel to which said hook is secured; and a cone-shaped guard carried by said swivel, projecting rearwardly over the forward ends of said hook-shank and guard-arms, for the purpose specified.

6. In a fish-hook, the combination of a hook; outwardly and rearwardly diverging spring guard-arms adapted to guard the point of said hook, rigidly secured to the shank thereof; a swivel to which said hook is secured; and a cone-shaped guard carried by said swivel, projecting rearwardly over the forward ends of said hook-shank and guard-arms, for the purpose specified.

7. In a fish-hook, the combination of a main hook; a spring-guard therefor having an outwardly-projecting barbed portion, the point of which lies adjacent to the point of said main hook, and a shank portion arranged parallel with and rigidly secured to the shank of said main hook at its forward end; a bait-hook rigidly secured to the shank of said main hook at its forward end; outwardly and rearwardly diverging spring guard-arms adapted to guard the points of said hooks, rigidly secured to the shank of said main hook; and a cone-shaped guard arranged over the forward ends of the said hook-shanks and guard-arms, for the purpose specified.

8. In a fish-hook, the combination of a main hook; a bait-hook rigidly secured to the shank of said main hook at its forward end; outwardly and rearwardly diverging spring guard-arms adapted to guard the points of said hooks, rigidly secured to the shank of said main hook; and a cone-shaped guard arranged over the forward ends of the said hook-shanks and guard-arms, for the purpose specified.

9. In a fish-hook, the combination of a main hook; a bait-hook rigidly secured to the shank of said main hook at its forward end; and outwardly and rearwardly diverging spring guard-arms adapted to guard the points of said hooks, rigidly secured to the shank of said main hook, for the purpose specified.

10. In a fish-hook, the combination of a main hook; a spring-guard therefor having an outwardly-projecting barbed portion, the point of which lies adjacent to the point of said main hook, and a shank portion arranged parallel with and rigidly secured to the shank of said main hook at its forward end; and outwardly and rearwardly diverging spring guard-arms adapted to guard the points of said hooks, rigidly secured to the shank of said main hook, for the purpose specified.

11. In a fish-hook, the combination of a main hook; a spring-guard therefor having an outwardly-projecting barbed portion, the point of which lies adjacent to the point of said main hook, and a shank portion arranged parallel with and rigidly secured to the shank of said main hook at its forward end; outwardly and rearwardly diverging spring guard-arms adapted to guard the point of said hook, rigidly secured to the shank thereof at its forward end; and a cone-shaped guard arranged over the forward ends of said hook-shanks and guard-arms, for the purpose specified.

12. In a fish-hook, the combination of a hook; outwardly and rearwardly diverging spring guard-arms adapted to guard the point of said hook, rigidly secured to the shank thereof at its forward end; and a cone-shaped guard arranged over the forward ends of said hook-shank and guard-arms, for the purpose specified.

13. The combination of the hook; a spring-guard therefor having an outwardly-projecting barbed portion, the point of which lies adjacent to the point of said hook, and a shank portion arranged parallel with and rigidly secured to the shank of said hook at its forward end; and a bait-hook rigidly secured to the shank of said main hook at its forward end, for the purpose specified.

14. The combination of the hook; a spring-guard therefor having an outwardly-projecting barbed portion, the point of which lies adjacent to the point of said hook, and a shank portion arranged parallel with and rigidly secured to the shank of said hook at its forward end, for the purpose specified.

In witness whereof I have hereunto set my hand and seal in the presence of two witnesses.

GEORGE R. MATHEWS. [L. S.]

Witnesses:
 ETHEL A. TELLER,
 OTIS A. EARL.